US006802006B1

(12) United States Patent
Bodrov (10) Patent No.: US 6,802,006 B1
(45) Date of Patent: Oct. 5, 2004

(54) SYSTEM AND METHOD OF VERIFYING THE AUTHENTICITY OF DYNAMICALLY CONNECTABLE EXECUTABLE IMAGES

(75) Inventor: Dmitry Bodrov, San Diego, CA (US)

(73) Assignee: Macrovision Corporation, Sunnyvale, CA (US)

( * ) Notice: Subject to any disclaimer, the term of this patent is extended or adjusted under 35 U.S.C. 154(b) by 0 days.

(21) Appl. No.: 09/360,297

(22) Filed: Jul. 22, 1999

(51) Int. Cl.[7] .............................. G06F 9/78; G06F 9/36; H04L 9/00
(52) U.S. Cl. ....................... 713/187; 713/164; 713/167; 713/200; 713/201
(58) Field of Search ................................ 713/187, 188, 713/200, 201, 164, 165, 166, 167

(56) References Cited

U.S. PATENT DOCUMENTS

| | | | |
|---|---|---|---|
| 4,919,545 A | 4/1990 | Yu | 380/25 |
| 5,023,907 A | 6/1991 | Johnson et al. | 380/4 |
| 5,103,476 A | 4/1992 | Waite et al. | 380/4 |
| 5,222,134 A | 6/1993 | Waite et al. | 380/4 |
| 5,235,642 A | 8/1993 | Wobber et al. | 380/25 |
| 5,319,705 A | 6/1994 | Halter et al. | 380/4 |
| 5,321,841 A | 6/1994 | East et al. | 395/725 |
| 5,375,240 A | 12/1994 | Grundy | 395/700 |
| 5,400,403 A | 3/1995 | Fahn et al. | 380/21 |
| 5,559,884 A | 9/1996 | Davidson et al. | |
| 5,572,590 A | 11/1996 | Chess | 380/4 |
| 5,692,047 A * | 11/1997 | McManis | 713/167 |
| 5,757,914 A * | 5/1998 | McManis | 713/187 |
| 5,940,513 A * | 8/1999 | Aucsmith et al. | 713/187 |
| 5,970,145 A * | 10/1999 | McManis | 713/187 |
| 6,026,293 A * | 2/2000 | Osborn | 455/411 |
| 6,070,239 A * | 5/2000 | McManis | 713/187 |
| 6,189,146 B1 * | 2/2001 | Misra et al. | 717/177 |
| 6,209,099 B1 * | 3/2001 | Saunders | 713/200 |
| 6,253,324 B1 * | 6/2001 | Field et al. | 713/187 |
| 6,307,955 B1 * | 10/2001 | Zank et al. | 382/121 |
| 6,510,516 B1 * | 1/2003 | Benson et al. | 713/167 |
| 6,546,487 B1 * | 4/2003 | McManis | 713/169 |
| 2001/0034818 A1 | 10/2001 | May et al. | |

FOREIGN PATENT DOCUMENTS

| | | | | |
|---|---|---|---|---|
| EP | 0 367 700 A3 | 12/1989 | | G06F/1/00 |
| EP | 0 567 800 A1 | 2/1993 | | G06F/1/00 |
| EP | 0 653 695 A2 | 2/1994 | | G06F/1/00 |
| EP | 0 689 120 A1 | 6/1995 | | G06F/1/00 |
| EP | 0778520 A2 | 6/1997 | | |
| WO | WO00/14631 | 3/2000 | | |

* cited by examiner

*Primary Examiner*—Ly V. Hua
(74) *Attorney, Agent, or Firm*—MacPherson Kwok Chen & Heid; David S. Park (57) ABSTRACT

System and method for verifying the authenticity of executable images. The system includes a validator that determines a reference digital signature for an executable image using the contents of the executable image excluding those portions of the executable that are fixed-up by a program loader. The validator then subsequent to the loading of the executable image determines an authenticity digital signature to verify that the executable image has not been improperly modified. In addition, the validator ensures that each of the pointers in the executable image have not been improperly redirected.

19 Claims, 6 Drawing Sheets

SYSTEM AND METHOD OF VERIFYING THE AUTHENTICITY OF DYNAMICALLY CONNECTABLE EXECUTABLE IMAGES

BACKGROUND OF THE INVENTION

1. Field of the Invention

The present invention relates to computer systems. More particularly, the present invention relates to a system and method of verifying the authenticity of dynamically connectable executable images.

2. Description of the Related Technology

New object models now provide for the dynamic integration of software applications at run time. For example, Windows, an operating system licensed by Microsoft Inc., allows for the dynamic integration of a software application with a dynamic link library during the execution of the software application. Upon a user request for the execution of the software application, a program loader copies a "disk image" of the application from disk storage to main memory to create a "process image." The disk image refers to the executable image before it is loaded, whereas the process image refers to the executable image after it is loaded in memory. Both the disk image and the process image typically include a fix-up section that identifies which portions of the software need to be fixed-up to reference the dynamic link library at run time.

Significantly, after loading, the process image is different then the disk image. As such, a checksum that had been prepared with respect to the disk image would no longer match the checksum of the process image, even if the process image had not been improperly tampered with.

Therefore, there is a need for a system that can verify the identity of a software application in a dynamic loading environment. In particular, the system should be able to determine whether a software application that has been dynamically connected to another data object has been tampered with subsequent to the execution of the software application.

SUMMARY OF THE INVENTION

One embodiment of the invention includes a system for determining the authenticity of an executable image, the system comprising an executable image having one or more pointers, and a validator capable of generating at a first point in time a reference digital signature based upon a selected content of the executable image excluding each of the pointers, wherein the validator generates an authenticity digital signature at a second point in time based upon the selected content of the executable image excluding each of the pointers, and wherein the validator determines whether the reference digital signature matches the authenticity digital signature.

Another embodiment of the invention includes a system for determining the authenticity of an executable image, the system comprising an executable image having one or more pointers and wherein the executable image includes information specifying whether each of the pointers reference locations that are within the executable image, and a validator capable of determining whether each of pointers references a respective location that is within the executable image.

Yet another embodiment of the invention includes a system for determining the authenticity of an executable image, the system comprising a first executable image, a second executable image that includes a pointer that references a location within the first executable image, and a validator capable of determining whether the pointer references a location within the first executable image.

Yet another embodiment of the invention includes a system capable of determining the authenticity of an executable image, the system comprising: a first executable image, a second executable image, comprising an import table including the identifier of the first executable image and one or more external pointers, each of the external pointers referencing a location within the first executable image, and a code section containing machine code and one or more import pointers, each of the import pointers referencing a location within the import table, and a validator capable of generating at a first point in time a reference digital signature based upon a selected content of the executable image, the selected contents excluding each of the import pointers and the external pointers, wherein the validator generates an authenticity digital signature at a second point in time based upon the selected content of the executable image excluding each of the one or more pointers, wherein the validator determines whether the reference digital signature matches the authenticity digital signature, wherein the validator determines whether each of the import pointers reference a location within the first executable image, and wherein the validator determines whether the import pointer references a location within the first executable image.

DETAILED DESCRIPTION OF THE INVENTION

The following detailed description is directed to certain specific embodiments of the invention. However, the invention can be embodied in a multitude of different ways as defined and covered by the claims.

System Overview

Figure 1:
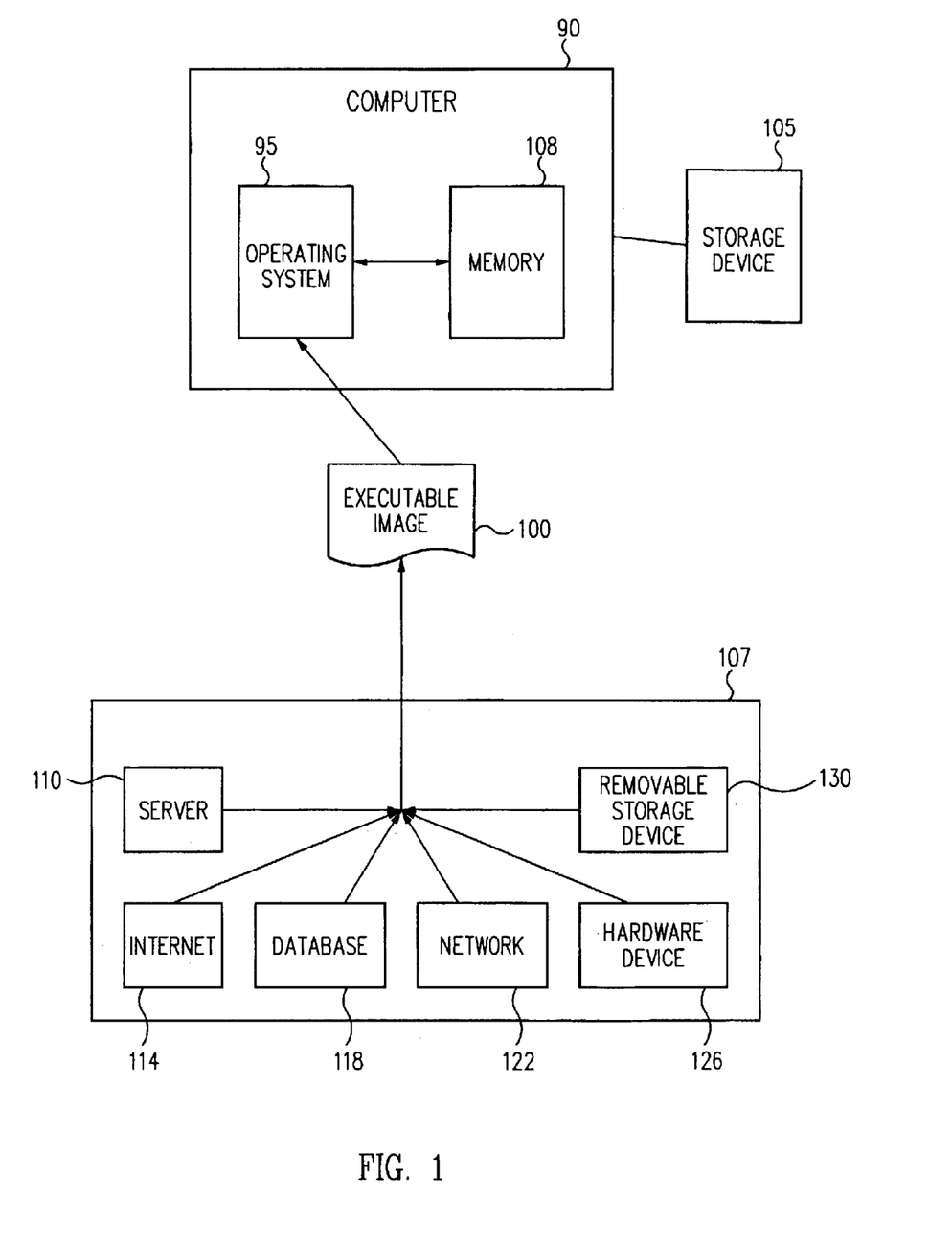
FIG. 1 is a high-level block diagram illustrating a computer of the present invention that is adapted to receive an executable image from one or more sources.

FIG. 1 is a high-level block diagram illustrating a computer 90. The computer 90 enables an authenticity check with respect to one or more executable images 100 that are executing on the computer 90.

The computer 90 may utilize any conventional general purpose single- or multi-chip microprocessor such as a Pentium® processor, a Pentium® Pro processor, a 8051 processor, a MPS® processor, a Power PC® processor, or an ALPHA® processor. In addition, the computer 90 may utilize any conventional special purpose microprocessor such as a digital signal processor or a graphics processor.

The computer 90 includes an operating system 95 and a memory 108. The operating system can be provided by any operating system vendor and can include: UNIX, LINUX, Disk Operating System (DOS), OS/2, Windows 3.X, Windows 95, Windows 98, and Windows NT. For convenience of description, an embodiment of the invention with respect to Windows 95 is set forth below.

The computer 90 is in communication with one or more executable image sources 107 that provide the executable image 100 to the computer 90. As is shown in FIG. 1, exemplary executable image providers include: a server 110, an Internet 114, a database 118, a network 122, a hardware device 126, and/or a removable storage device 130.

The executable image 100 is a data object that can define by itself or in conjunction with other executable images, one or more software applications. The software applications may include, for example: a word processor, a database, a digital rights management system, a personal finance utility, a graphics tool, an Internet browser, a computer game, a communications program, an authorization program, an electronic wallet, a multi-media renderer or a contract manager. Furthermore, the executable image 100 is dynamically connectable with other executable images. For example, in an embodiment of the invention that is developed for use with the Windows 95, the executable image is a dynamic link library (DLL).

The Internet 114 includes network variations such as public internet, a private internet, a secure internet, a private network, a public network, a value-added network, an intranet, and the like.

The network 122 may include any type of electronically connected group of computers including, for instance, the following networks: Intranet, Local Area Networks (LAN) or Wide Area Networks (WAN). In addition, the connectivity to the network may be, for example, remote modem, Ethernet (IEEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration. The hardware device 126 can be a logic chip, a ROM, a RAM, a smart card, or a central processing unit. The removable media storage 130 can be a floppy disk, a compact disk, a hard disk, a tape drive, a ROM, or other persistent storage medium.

Figure 2:
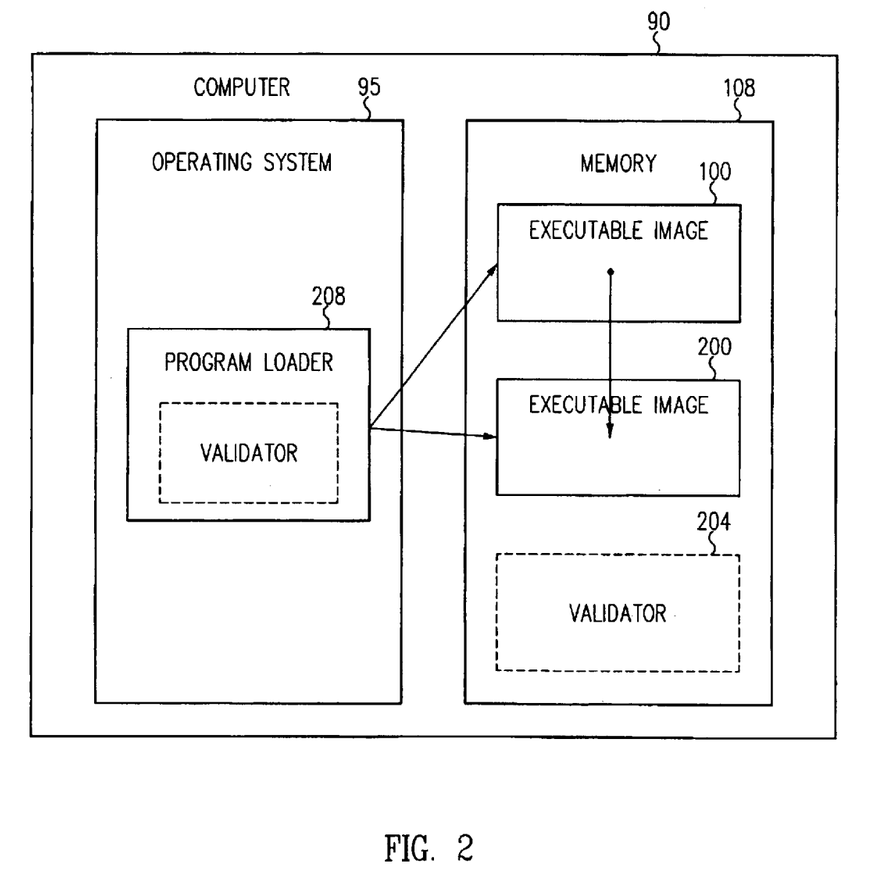
FIG. 2 is a block diagram illustrating a validator that is capable of determining the authenticity of one or more executable images that reside on the computer of FIG. 1.

FIG. 2 is a block diagram illustrating a validator 204. In one embodiment of the invention, the validator 204 is an executable image, similar in format to the executable image 100. In another embodiment of the invention, the validator 204 is integrated with the executable image 100. In yet another embodiment of the invention, the validator 204 is integrated with a program loader 208. One function of the program loader 208 is to copy an executable image 100 from the storage device 105 (FIG. 1) to the memory 108 and to bind the code and data pointers to an appropriate address prior to the execution of the executable image 100. For convenience of description, the following description assumes that the validator 204 is a separate application that is distinct from the executable image 100 and the program loader 208.

The validator 204 verifies the authenticity of the executable image 100 under selected conditions which are described in further detail below. As can be appreciated by the skilled technologist, the validator 204 and the program loader 208 are comprised of various sub-routines, procedures, definitional statements, and macros that are typically separately compiled and linked into a single executable program. Therefore, the following description is used for convenience to describe the functionality of the these items.

The validator 204 and the program loader 208 (FIG. 1) may be written in any programming language such as C, C++, BASIC, Pascal, Java, and FORTRAN. C, C++, BASIC, Pascal, Java, and FORTRAN are industry standard programming languages for which many commercial compilers and interpreters can be used to create executable code.

FIG. 2 illustrates the executable image 100 after it has been connected to an executable image 200. It is noted that the executable image 200 can comprise the same types of data objects as described above with respect to the executable image 100. One function of the validator 204 is to verify the authenticity of the executable images, such as executable image 100 and executable image 200, after the executable images have been loaded into the memory 108.

The process for verifying the authenticity of the executable images is set forth in detail with reference to FIGS. 5 and 6. However in brief, the validator 204 analyzes the executable image 100 before the executable image 100 is loaded into the memory 108 and generates a reference digital signature with respect to the executable image 100. After the executable image 100 is loaded, the validator 204 generates an authenticity digital signature to ensure that the executable image 100 has not been tampered with. In addition, the validator 204 examines the binding between the executable image 100 and the executable image 200 to ensure that binding between the executable image 100 has not been improperly re-directed to another executable image.

Figure 3:
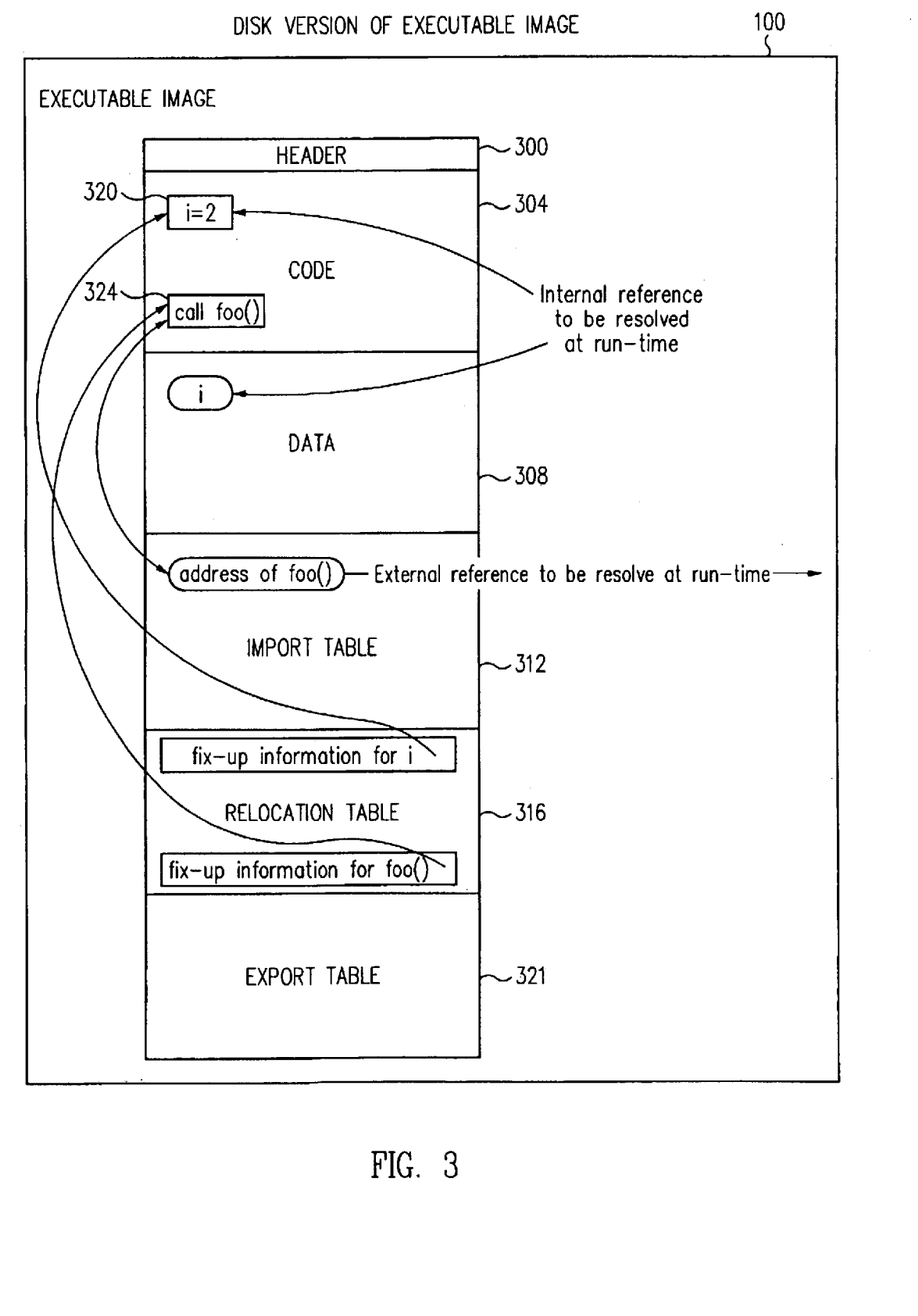
FIG. 3 is a block diagram illustrating the internal structure of one of the executable images of FIG. 2.

FIG. 3 is a block diagram illustrating in further detail the internal structure of one embodiment of the executable image 100 that has been built as a dynamically linked library and which has been stored on the storage device 105 (FIG. 1).

The executable image 100 includes a number of sections including a header section 300, code section 304, a data section 308, an import table 312, a relocation table 316, and an export table 321. It is also noted that executable image 100 includes a number of pointers that are described in further detail below. However, in general, a pointer is a reference that identifies a location within the memory 108 either absolutely with respect to the memory 108 (FIG. 1) or relatively with respect to another location.

The header section 300 identifies the relative location of other sections and/or tables that are within the executable image 100. The code section 304 includes the compiled machine code for the executable image 100. For example, the code section 304 includes the machine instructions for the computer 90 (FIG. 1). As is shown in FIG. 3, the code section 304 includes instructions that reference other sections within the executable image 100 as well as without the executable image 1100. As is shown by a block 320, the code section 304 includes instructions for the assignment of the number "2" to a global variable "i". However, the actual address of the variable "i" as stored on the storage device 105 (FIG. 1) is not defined in the memory 108 since the executable image 100 has not yet been loaded into the memory 108 (FIG. 1). Furthermore, the code section 304 includes an instruction to call a function foo( ). The call to the procedure foo( ) includes an import pointer which references a location within the import table 312.

The data section 308 is used to store the contents of any global variables that are identified in the code section 304. The import table 312 includes various items of information to assist the program loader 208 (FIG. 2) in connecting the executable image 100 to another executable image. The import table 312 includes: an identifier, such as a name, for each of the procedures that are maintained;,by other executable images, the name of the executable image, and one or more external pointers which reference the addresses of externally maintained procedures. The import table 312, as is stored on the storage device 105 (FIG. 1), does not yet reference the memory address of the procedure foo( ).

The relocation table 316 identifies the position of each of the portions of the code section 304 that are in need of "fixing-up" upon the loading of the executable image 100. The term fixing-up as used herein refers to the process of modifying the executable image 100 in memory such that any unresolved pointers reference the appropriate data and/or code locations. After a pointer has been fixed-up by the program loader 208, it is said to be "bound" to a selected address.

The export table 321 identifies each of the procedures that are made publicly available by the executable image 100. It is noted that the executable image 100 can include other information such as debug information or other tables to assist with the loading and/or linking process.

The validator 204 (FIG. 2) determines a reference digital signature with respect to the executable image 100 as it is stored on the storage device 105. The process for generating the reference signature is described in further detail with respect to FIG. 6. In one embodiment of the invention, the validator 204 determines the reference digital signature with respect to the entire executable image 100 excluding any pointers that are in need of fixing up by the program loader 208 (FIG. 2). In another embodiment of the invention, the validator 204 determines a reference digital signature with respect to selected sections, such as the code section 304 and/or the import table 312 of the executable image 100 excluding any of the addresses that are in need of fixing up by the program loader 208.

Figure 4:
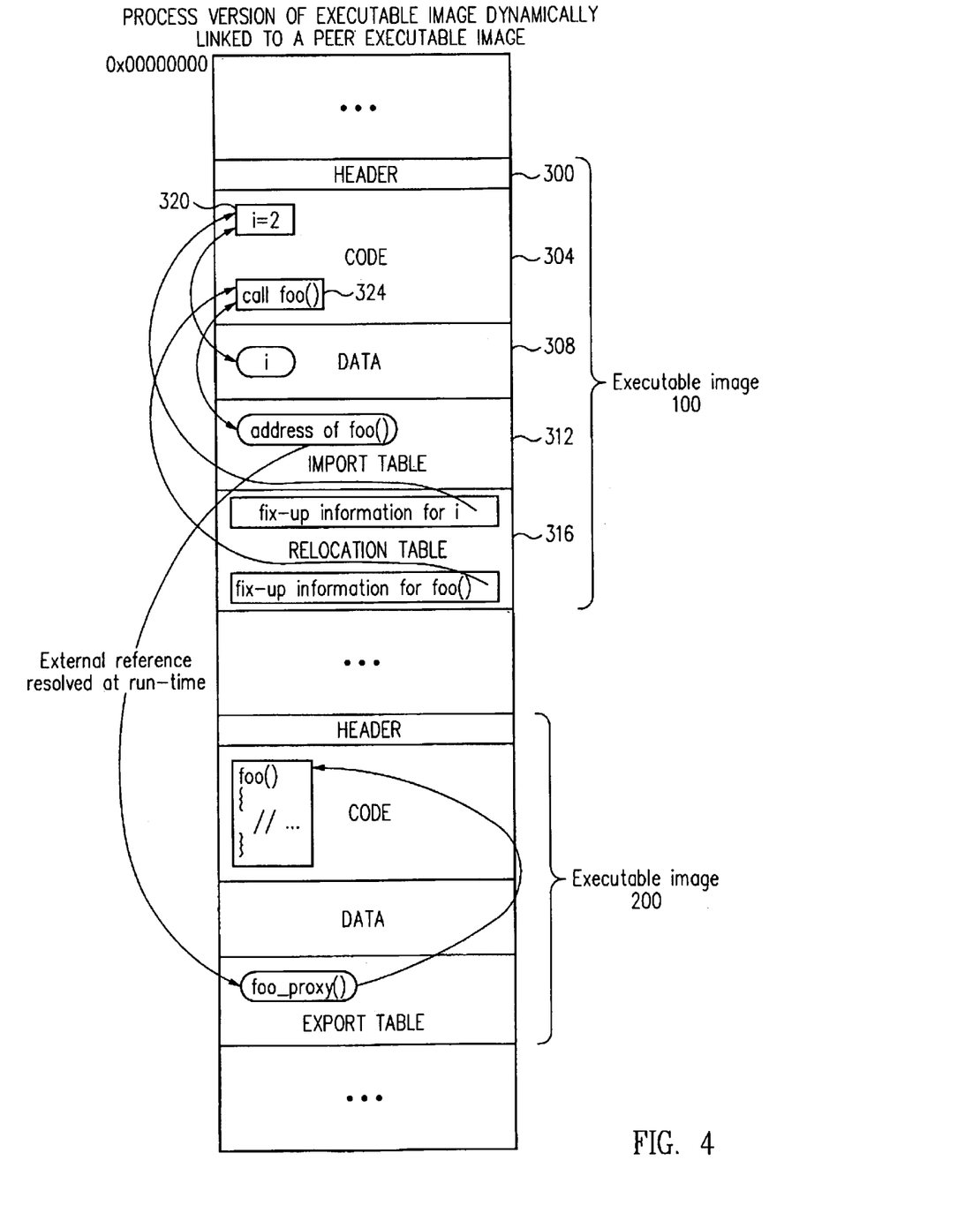
FIG. 4 is a block diagram illustrating two of the executable images of FIG. 2 being linked after a loading process.

FIG. 4 is a block diagram illustrating the executable image 100 after it is has been fixed-up with respect to the executable image 200. As can be seen by inspection of FIG. 4, a data pointer for the variable "i" has been bound to an address in the data section 308 according to the fix-up information contained within the relocation table 316. Further, an external pointer in the import table 312 has been bound to an export table in the executable image 200. An export pointer at the referenced address in the export table of the second executable image 200 has been bound to the actual location of the procedure foo( ) that resides within the executable image 200.

After being fixed-up, the validator 204 (FIG. 2) performs various authenticity checks with respect to the executable image 100. Each of these authenticity checks are described in further detail with respect to FIGS. 5 and 6. However, in summary, the validator 204 performs the following described functions.

First, the validator 204 determines an authenticity digital signature with respect to the same addresses that were used to generate the reference digital signature. If the authenticity digital signature differs from the reference digital signature, the validator 204 (FIG. 2) assumes that the executable image 100 has been tampered with.

Second, the validator 204 examines each of the bindings in the import table 312 to ensure the addresses which are referenced by the import table have not been tampered with. If the import table 312 is improperly modified, a procedure call to a selected function could be rerouted to an untrusted routine other than the routine intended by the provider of the executable image 100. Such an untrusted routine could accidentally or deliberately return false or other injurious data to the executable image 100.

Figure 5:
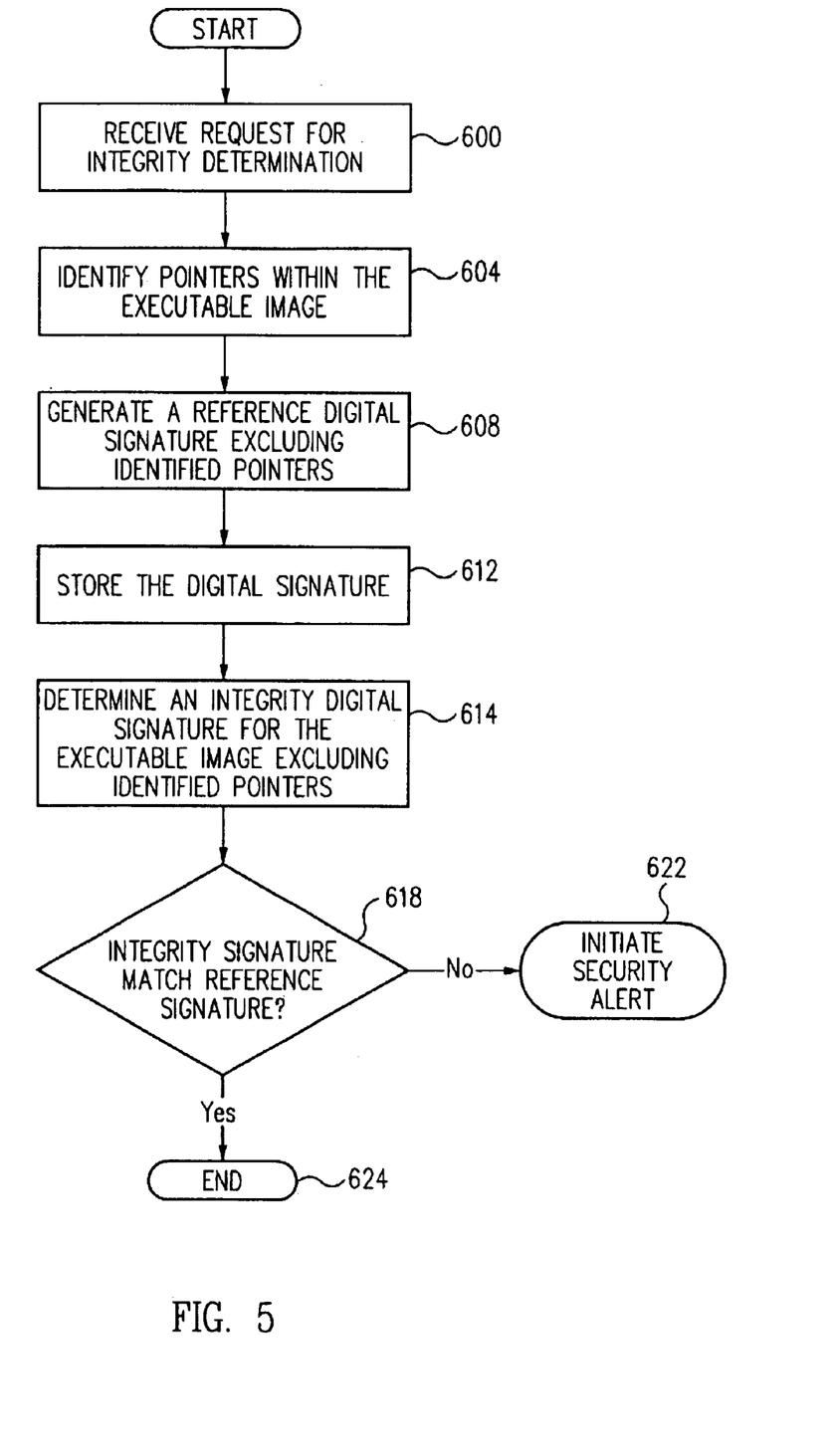
FIG. 5 is a flowchart illustrating a process performed by the validator of FIG. 2 during an authenticity check of one of the executable images shown in FIG. 2.

FIG. 5 is a flowchart illustrating a process for verifying the authenticity of the executable image 100. Starting at a state 600, the validator 204 (FIG. 2) receives a request for determining the authenticity of the executable module 100 (FIG. 1). In one embodiment of the invention, the request is generated by the program loader 208 In another embodiment of the invention, the request is generated by the operating system 95 (FIG. 1). In yet another embodiment of the invention, the request is generated by an executable image (not shown) executing on the computer 90. (FIG. 1). In yet another embodiment of the invention, the request is generated by a routine in the validator 204.

Continuing to a state 604, the validator 204 (FIG. 2) identifies each of the pointers within the executable image 100 that are in need of fixing-up. In one embodiment of the invention, if the authenticity of only selected sections in the executable image 100 are to be determined, the validator 204 identifies only those pointers that fall within the selected sections of the executable image 100. For example, the validator 204 can be configured to identify only those pointers that fall within the code section 304 (FIG. 3) or the import table 312 (FIG. 3).

In one embodiment of the invention, the validator 204 parses the relocation table 316 to identify each of these pointers (FIG. 3). As discussed above with reference to FIG. 3, the relocation table 316 identifies the location of an address relative to the base of the executable image 100. By examining the relocation table 316, the validator 204 can identify which portions of code section 304 are modified by the program loader 208 during loading.

Continuing to a state 608, the validator 204 (FIG. 2) generates a reference digital signature with respect to the executable image 100 (FIG. 1). A digital signature as used herein is defined to include any methodology for identifying the contents of a selected set of data. In its simplest form, a digital signature can include a complete copy of the selected set of data that is to be signed. However, the digital signature can also include the results of a hashing function that has been applied to the selected set of data. Further, a digital signature can be a digital certificate. It is to be appreciated by the skilled technologist that one of any of a number of standard hashing functions may be used to generate the reference digital signature.

Still referring to the state 608, in one embodiment of the invention, the validator 204 determines the reference digital signature based upon the contents of the entire executable image 100 excluding any addresses that are in need of fixing-up by the program loader 208 (FIG. 2). In another embodiment of the invention, the validator 204 determines a reference digital signature based upon the content of selected sections, such as the code section 304 and/or the import table 312 excluding any of the addresses that are in need of fixing-up by the program loader 208.

Proceeding to a state 612, the validator 204 (FIG. 2) stores the reference digital signature for later retrieval. In one embodiment of the invention, the validator 204 stores the reference digital signature in the storage device 105 (FIG. 1). In another embodiment of the invention, the validator 204 stores the reference digital signature in a selected section of the executable image 100, such as a resource table (not shown). In yet another embodiment of the invention, the reference digital signature is appended to the executable image 100. In yet another embodiment of the invention, the reference digital signature is stored in a database, a web server, or on the network 122 (FIG. 1). In yet another embodiment of the invention, the reference digital signature is created before the executable image 100 is provided to the computer 90. In this embodiment, the reference digital signature can be generated in any of the above described ways.

Next, at a state 614, the validator 204 (FIG. 2) determines an authenticity signature of the executable image 100 after or before the executable image 100 has been loaded by the program loader 208 into the memory 108 (FIG. 2). At this step, the validator 204 reapplies the hashing function that was applied by the validator 204 during the state 608. The validator 204 can be configured to determine the authenticity digital signature upon the occurrence of one or more selected conditions, such as: the expiration of a timer, an authenticity self test of the executable image 100, an idle time of the computer 90 (FIG. 1), or upon a request of the executable image 100.

Continuing to a decision state 618, the validator 204 (FIG. 2) determines whether the reference digital signature (generated in the state 608) matches the authenticity digital signature (generated in the state 614). If the reference digital signature does not match the authenticity digital signature, the validator 204 proceeds to a state 622, wherein the validator 204 initiates a security alert. At the state 622, the validator 204 may perform a plurality of functions such as: unload the executable image 100, load a new copy of the executable image 100 from the storage 105 (FIG. 1) to the memory 108 (FIG. 1), load a new version of the executable image 100 from the network 122, delete the executable image 100 from the storage 105, display a warning to a user residing at the computer 90 (FIG. 1), transmit an error message to a remote computer (not shown) via the network 122, or undo one or more actions performed by the executable image 100.

Referring again to the decision state 618, if the validator 204 (FIG. 2) determines that the reference digital signature matches the authenticity digital signature, the validator 204 proceeds to an end state 624. Depending on the embodiment, the validator 204 (FIG. 2) may return to the state 614 to re-determine the authenticity digital signature upon the occurrence of the selected conditions.

Figure 6:
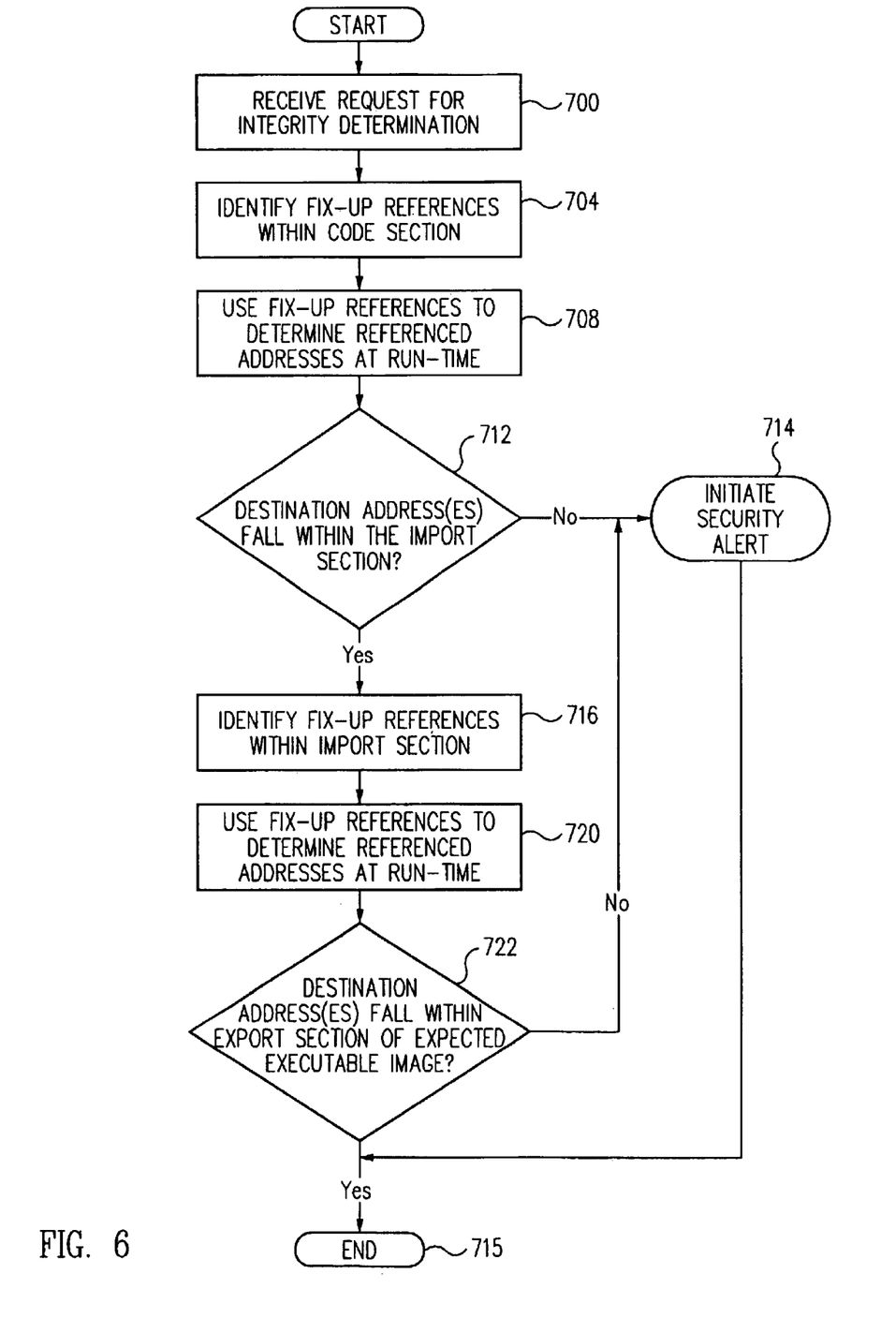
FIG. 6 is a flowchart illustrating another process performed by the validator of FIG. 2 during an authenticity check of one of the executable images shown in FIG. 2.

FIG. 6 is a flowchart illustrating another process performed by the validator 204 of FIG. 2 during an authenticity check of one of the executable images shown in FIG. 2. The process performed by FIG. 6 is distinct from the process performed by FIG. 5 and can be performed in isolation or in conjunction with the processes performed by FIG. 5. In particular, FIG. 6 illustrates a process for verifying that each of the pointers in the executable image are bound to a proper location. The following text describes an authenticity check process with respect to import pointers in the code section 304 and export pointers in the import table 312 of the executable image 100. However, it is to be appreciated by the skilled technologist, that a similar process can be employed with respect to other types of pointers in the executable image 100.

Starting at a state 700, the validator 204 (FIG. 2) receives a request from a requestor for determining the authenticity of the executable module 100 (FIG. 1). In one embodiment of the invention, the requestor is the program loader 208 (FIG. 2). In another embodiment of the invention, the requestor is the operating system 95 (FIG. 1). In yet another embodiment of the invention, the requestor is an executable image (not shown) executing on the computer 90 (FIG. 1). In yet another embodiment of the invention, the requester is a routine within the validator 204. Further, the request can be initiated by one of the requesters upon the occurrence of one or more selected conditions which include: the expiration of a timer, the detection of an idle time with respect to the computer 90 (FIG. 1), and/or before the execution of a critical action, such as a bank transaction.

Continuing to a state 704, the validator 204 (FIG. 2) identifies each of the import pointers in the code section 304.

In one embodiment of the invention, the validator 204 parses the relocation table 316 to identify each of these import pointers (FIG. 3).

Next, at a state 708, the validator 204 (FIG. 2) examines each of the import pointers in the code section 320 to determine whether each of the import pointers are bound to locations that are within the import table 312. At this state, in one embodiment of the invention, the validator 204 reads the header 300 to determine the begin and end address of the import table 312.

If each of the import pointers are not bound to a location that is within the import table 312 (FIG. 3), the validator 204 (FIG. 2) proceeds to a state 714 wherein the validator 204 initiates a security alert. At the state 714, the validator 204 may perform a plurality of functions such as: unload the executable image 100, load a new copy of the executable image 100 from the storage 105 (FIG. 1), to the memory 108 (FIG. 1), load a new copy of the executable image 100, delete the executable image 100 from the storage 105, display a warning to a user residing at the computer 90 (FIG. 1), transmit an error message to a remote computer (not shown) via the network 122, or undo one or more actions performed by the executable image 100. The process flow moves to an end state 715 and ends.

Referring again to the decision state 712, if the validator 204 (FIG. 2) determines that each of the import pointers within the code section. 304 are bound to the import table 312 (FIG. 3), the validator 204 proceeds to a state 716. At the state 716, the validator 204 identifies each of the external pointers in the import table 312.

Proceeding to a state 720, the validator 204 (FIG. 2) determines the binding locations of the external pointers in the import table 312 (FIG. 2) In one embodiment of the invention, the validator 204 stores the binding locations in an external pointer table (not shown) which is maintained by the validator 204.

Continuing to a decision state 722, the validator 204 determines whether the binding locations of the external pointers reside within one of the executable images identified by the import table 312 (FIG. 2). For convenience of description, the executable images identified by the import table 312 are collectively referred to as the exporting executable images.

In one embodiment of the invention, the validator 204 calls the operating system 95 (FIG. 1) to determine the locations of the exporting executable images within the memory 108 (FIG. 1). For example, Windows 95 provides a procedure call named "GetModuleHandle( )" which returns the base address of an executable image given the name of the executable image. Using the base address, the validator 204 can identify locations of the header as well as the other sections of the exporting executable images.

Still referring to the state 722, if the validator 204 determines that each of the external pointers are not bound to the exporting executable images, the validator 204 proceeds to the state 714 which is described in further detail above. However, if the validator 204 determines that each of the external pointers are bound to the exporting executable images, the validator 204 proceeds to the end state 715 and ends.

Advantageously, the present invention allows for static, dynamic, and run-time verification of the authenticity of executable images and does not require changes to either the source or the object code of an executable image. The present invention ensures that an executable image is authentic and has not been tampered with after it has loaded. After a reference digital signature is determined, the validator 204 can subsequently generate an authenticity digital signature to ensure that the data object has not been modified. Further, the validator 204 can determine whether each of the pointers in the executable image have been bound to a correct location.

For example, with respect to a data pointer in the code section 304, the validator 204 can check the relocation table 316 to ensure that the data pointer references a location within the data section 308. Further, for example, with respect to an external pointer in the import table 312, the validator 204 can ensure that the external pointer references a trusted executable image, the name of which is included in the import table 312. Since the name of the executable image is not modified by the program loader 208 (FIG. 2), the validator 204 can ensure as well that the name of a trusted executable image has not changed by the use the reference and authenticity digital signatures.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A system for determining the authenticity of an executable image, the system comprising:
    an executable image having one or more pointers that are in need of fixing up by a program loader; and
    a validator capable of generating at a first point in time a reference digital signature based upon a selected content of the executable image excluding each of the pointers, wherein the validator generates an authenticity digital signature at a second point in time based upon the selected content of the executable image excluding each of the pointers, and wherein the validator determines whether the reference digital signature matches the authenticity digital signature.

2. The system of claim 1, wherein the reference digital signature is stored within the executable image.

3. The system of claim 1, wherein the reference digital signature is stored on a network.

4. The system of claim 1, wherein the reference digital signature is stored in a database.

5. The system of claim 1, wherein the reference digital signature is stored in the validator.

6. The system of claim 1, wherein the first point in time is prior to the executable image being processed by the program loader and wherein the second point in time is subsequent to the executable image being processed by the program loader.

7. The system of claim 1, wherein the first point in time is prior to the executable image being processed by the program loader and wherein the second point in time is prior to the executable image being processed by the program loader.

8. The system of claim 1, wherein the first point in time is subsequent to the executable image being processed by the program loader and wherein the second point in time is subsequent to the executable image being processed by the program loader.

9. The system of claim 1, wherein the validator generates a warning upon the determination that the reference digital signature does not match the authenticity digital signature.

10. The system of claim 1, wherein the validator generates a warning to a source of the executable image upon the determination that the reference digital signature does not match the authenticity digital signature.

11. The system of claim 1, wherein the validator generates a warning to a source of the validator upon the determination that the reference digital signature does not match the authenticity digital signature.

12. The system of claim 1, wherein the selected content comprises a code section and one or more of the pointers that reference an import table that is in the executable image.

13. The system of claim 1, wherein the selected content comprises an import table and one or more of the pointers that reference an address in another executable image.

14. A method of determining the authenticity of an executable image, the method comprising:
    identifying one or more locations within the executable image, each of the identified locations being modified by a program loader;
    generating a reference digital signature based upon a selected content of the executable image excluding the one or more identified locations;
    generating an authenticity digital signature based upon the selected content of the executable image excluding the one or more identified locations; and
    determining whether the authenticity digital signature matches the reference digital signature.

15. The method of claim 14, additionally comprising generating a warning upon the determination that the authenticity digital signature does not match the reference digital signature.

16. The method of claim 14, additionally comprising generating a warning to a provider of the executable image upon the determination that the authenticity digital signature does not match the reference digital signature.

17. The method of claim 14, wherein the selected content includes the entire executable image.

18. The method of claim 14, wherein the selected content comprises a section of machine code.

19. The method of claim 14, wherein the selected content comprises an import table that resides in the executable image.

* * * * *